Dec. 11, 1962  G. J. BRUGGINK, SR  3,067,756
ATTACHMENT FOR BARN MILK LINES
Filed March 1, 1961
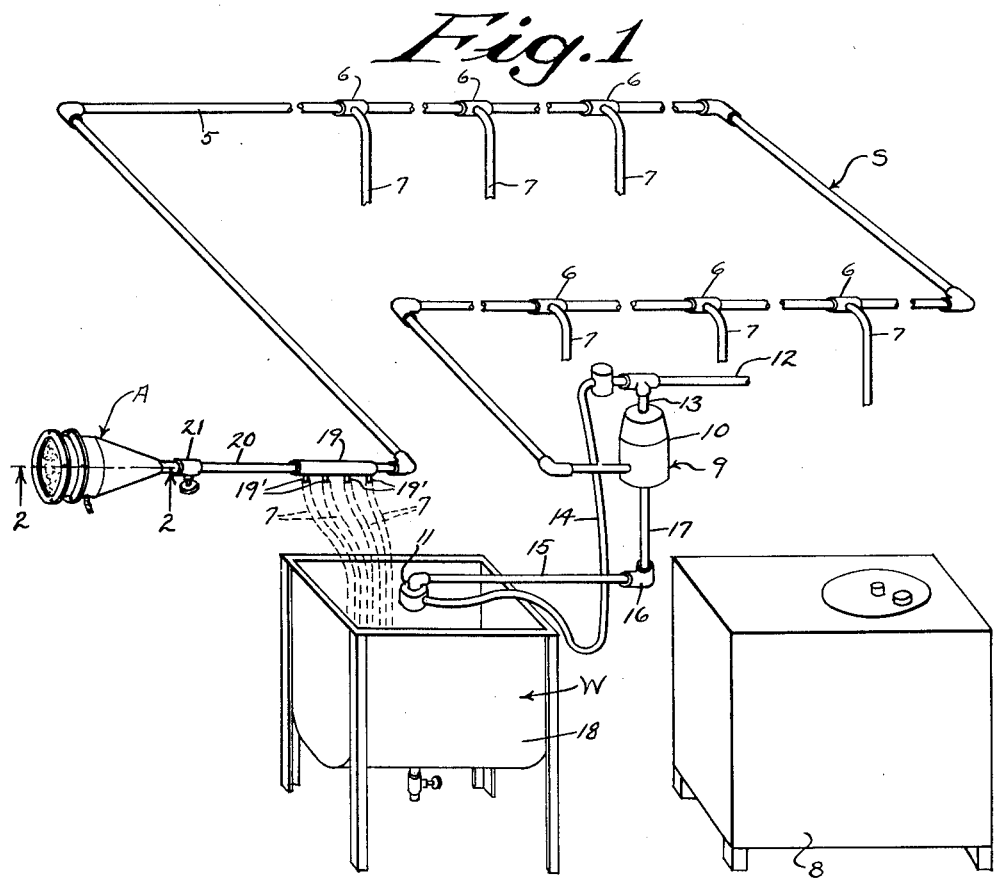
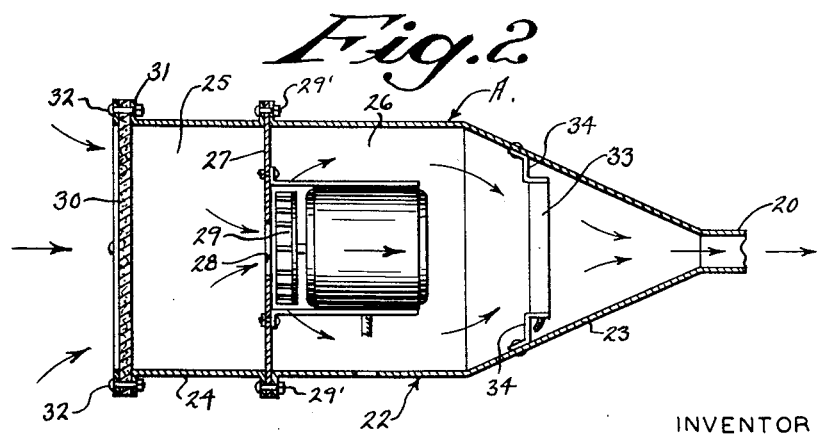
INVENTOR
GORDON J. BRUGGINK, SR.
BY
*Wright Wright*
ATTORNEYS

United States Patent Office 3,067,756
Patented Dec. 11, 1962

3,067,756
ATTACHMENT FOR BARN MILK LINES
Gordon J. Bruggink, Sr., Box 192, Oostburg, Wis.
Filed Mar. 1, 1961, Ser. No. 92,704
3 Claims. (Cl. 134—94)

This invention appertains broadly to milking apparatus for milch cows and more particularly to an apparatus of the type having a milk pipe line in a barn.

In milk pipe line systems, and particularly systems of the so-called "around the barn milking," it is customary to provide means for washing out the pipe line after the milking operation to maintain the line in a sanitary condition, without the necessity of taking the pipe down and washing individual lengths and fittings. In a number of the systems, glass pipe and fittings are utilized. After the washing operation, the inner surfaces of the pipe and fittings are wet and a residue of the washing solution remains in the system.

It is, therefore, one of the primary objects of my invention to provide a novel and simple means for removing residue washing solution and drying the milk pipe line after the washing operation by forcibly moving hot filtered air through the milk pipe line.

Another salient object of my invention is to provide an attachment for a milk pipe line which can be readily incorporated with the line to form a part thereof, and without change thereto or to the washing apparatus.

A further important object of my invention is to provide a device for drying a milk pipe line after the washing operation embodying a casing having a fitting for connection with the pipe line, preferably near the tank for washing solution, with a motor driven blower therein capable of forcing air through the line with means for preheating the air as the same leaves the casing for insuring the quick sanitary drying of the pipe.

Another further important object of my invention is the provision of means for incorporating a desired type of air filter with the inlet end of the casing for insuring the delivery of clean air to the line and to so arrange the filter relative to the blower that a maximum amount of air will be delivered to the pipe line.

A still further important object of my invention is to provide a milk line dryer of the above character, which will be durable and efficient in use, with low maintenance cost, and one which can be incorporated with the milk pipe line at an economical cost.

With these and other objects in view, the invention consists in the novel construction, arrangement and formation of parts, as will be hereinafter more specifically described and claimed and illustrated in the accompanying drawing, in which drawing FIGURE 1 is a diagrammatic view in perspective, showing my novel dryer incorporated with a milking system of the "around the barn" type, the view also showing the washing apparatus incorporated with the line, and FIGURE 2 is a longitudinal sectional view through my apparatus.

Referring to the drawing in detail, wherein similar reference characters designate corresponding parts throughout the several views the letter S indicates a conventional pipe line milking system and by way of example the same has been shown to be of the so-called "around the barn" pipe line system. Thus, the same includes a milk pipe line 5 which extends around a barn (not shown). In conjunction with the pipe line 5 an ordinary type of vacuum washer W is utilized. The system S includes a plurality of valved outlet nipple fittings 6 for the milk to which is removably attached the main tube 7 carrying the milking head teat cups etc. (not shown). The pipe line 5 is normally pitched or inclined downwardly toward a bulk tank 8 for receiving the milk. The outlet end of the pipe line is connected with a releaser 9, which includes the releaser tank or bowl 10 and releaser head 11. The releaser 9 is connected to a vacuum line 12 by means of a pipe 13 leading to the bowl 10 and by means of a flexible hose 14 leading to the releaser head 11. The releaser head 11 is connected to a pipe 15 which, in turn, is connected to a L-coupling 16, which is mounted for swinging movement on the lower end of the milk discharge pipe 17. The washing apparatus also includes a washing tank 18 for a cleaning solution and the releaser 11 can be moved over the cleaning tank 18 during the washing operation or over the bulk tank 8 during the milking operation for discharging milk into the tank. The vacuum line is, of course, connected to a vacuum pump (not shown), and the line is also connected with the teat cups (not shown). The end of the pipe line remote from the releaser has connected thereto a manifold 19 disposed directly above the tank 18 and this manifold forms a part of the washing system and is provided with a plurality of nipples 19'. Considering that the milking operation has been completed, then the hoses 7, for the milking heads are removed from their valved fittings 6 and placed on the nipples 19' as shown in dotted lines in FIGURE 1, and the teat cups and heads are immersed within the cleaning solution. With the vacuum line in operation the cleaning solution is drawn from the tank 18 through the milking heads, tubes or hoses 7 into the manifold and through the pipe line, the vacuum releasing mechanism 9 and dumped into the tank 18. After the washing operation is completed, the hoses or tubes 7 with the milking heads are removed from the manifold and the solution in the tank is drained therefrom.

The system above described, is of a type, as heretofore stated, now in general use and hence the entire system has only been shown diagrammatically.

Now considering that the washing operation has been completed, it can be seen that there is some solution still remaining in the pipe line and that the inner surfaces of the pipe line are wet. It is highly desirable to provide some means for insuring the blowing out of the pipe line and the complete drying thereof, and my invention resides in a drying attachment A for connection with the milk pipe line 5.

The attachment A is connected to the manifold 19 by a pipe 20 and flow of liquid and air is controlled by a valve 21 interposed in the pipe 20. During the milking operation and during the washing operation the valve 21 is closed. During the drying operation the valve 21 is open. Also during the drying operation, the hoses 7 are removed from the nipples 19' as heretofore explained and the nipples are then closed by removable caps.

My drying attachment A comprises an elongated casing 22 and the forward end of this casing tapers, as at 23, toward the pipe 20, and the pipe 20 is connected with the restricted outlet end of the casing in any preferred manner. The casing 22 also includes an elongated body portion 24 and the casing is preferably divided into two chambers 25 and 26 by a partition plate 27. The partition plate 27 is provided with a centrally disposed opening 28. The partition plate 27 rigidly supports a motor driven blower 29 and this blower has its inlet communicating with the opening 28 so that air is forcibly drawn through the opening 28 and discharged forcibly into the chamber 26 through the conical end thereof and into the pipe 20. The casing 22 can be constructed in various manners, but as shown, the same is made in sections for ease of assembly and the mounting of the motor driven suction fan or blower, and the partition plate 27 is secured between the sections of the casing by bolts 29'. The inlet end of the casing is open and this open end receives any preferred type of filter 30, so that air being drawn into the casing will be filtered. The filter 30 can be detachably mounted on the casing, in any desired way, and as illustrated the end of the casing receiving the filter is flanged, as at 31, and the filter is connected to the flange by bolts 32. The chamber 23 constitutes the initial means for receiving the air through the filter and thus, a large area is provided for the admittance of air into the casing, and this insures the proper flow of air through the opening 28. Mounted within the casing forwardly of the blower 29 is an electric heater 33 and this heater can be secured in place by means of brackets 34. The electric heater is of such a size as to insure the raising of the temperature of the air flowing through the same to the desired degree. If desired, a time control switch (not shown) can be provided for automatically cutting off the flow of current to the heater, and to the motor for the blower after a certain time has elapsed.

Again, considering that the washing operation has been completed, then the vacuum pump (not shown) for the vacuum system is cut off and caps are placed on the nipples 19'. The valve 21 is now open and the switches to the motor for the blower and electric heating element 33 are closed. Air will now be forcibly drawn into the casing and forced past the electric heating element 33 and the air will be guided and somewhat compressed and forced into the pipe 20 through the manifold 19 and through the entire milking pipe line 5. This hot filtered air rushing through the pipe line at a desired rate of speed will quickly dry the pipe line and remove all residue solution therefrom. This can be expeditiously accomplished and the milking pipe line 5 can be maintained in a clean dry, sanitary condition. With the washing and drying operation completed the valve 21 can be closed and the circuits to the electric heating element 33 and motor for the blower opened. The releaser 11 can now be swung over to the bulk tank 8 and the system is now ready for the next milking operation.

While I have shown my drying apparatus connected with one type of milking system, it is to be understood that the same can be utilized for drying pipes in other types of milking systems and in fact can be used for drying pipes in any type of conveyor system, where such conveyor or pipe system requires a cleaning operation.

While in the drawings I have shown the air being blown through the pipes for drying, it is to be also understood that the action can be reversed and the heated, filtered air can be sucked through the pipes for the drying operation.

Various changes in details may be made without departing from the spirit of the invention, or scope of the claims, but what I claim as new is:

1. In a milking system for barns including a milk pipe line, a bulk tank for receiving milk from the line and means for washing the pipe line after the milking operation, means for drying and blowing out the pipe line after the washing operation including a casing having an enlarged inlet and a restricted outlet with the outlet connected directly to one end of the milk pipe line, means in the casing for forcibly drawing air into the casing and out of the casing through the restricted outlet thereof and into the pipe line, valve means for closing a hose communication between the casing and pipe line when the pipe line is being used for the milking operation and washing operation, and means disposed adjacent to the restricted outlet of the casing for heating the air flowing through the casing and out of the restricted outlet.

2. In a milking system for barns including a milk pipe line, a bulk tank for receiving milk from the line and means for washing the pipe line after the milking operation, means for drying and blowing out the pipe line after the washing operation including a casing having an enlarged inlet and a restricted outlet with the outlet connected directly to one end of the milk pipe line, means in the casing for forcibly drawing air into the casing and out of the casing through the restricted outlet thereof and into the pipe line, valve means for closing a hose communication between the casing and pipe line when the pipe line is being used for the milking operation and washing operation, means disposed adjacent to the restricted outlet of the casing for heating the air flowing through the casing and out of the restricted outlet, and means for filtering the incoming air at the inlet of the casing.

3. A drying attachment for a milk pipe line of a milking system installation for barns comprising a casing including a cylindrical body and a conical tapering portion having a restricted outlet for connection with the milk pipe line, the opposite inlet end of said casing being open, a partition in said casing dividing the body into an air inlet compartment and an air outlet compartment communicating with the restricted outlet having a centrally disposed air inlet opening, a motor driven impeller in said second chamber for drawing air through said opening and forcing the air out of the restricted outlet, a removable filter connected with the inlet end of the chamber for filtering air entering into the first chamber, and an electric heating element disposed in advance of the impeller and in rear of the restricted outlet for raising the temperature of the air flowing through the casing.

References Cited in the file of this patent

UNITED STATES PATENTS

| | | |
|---|---|---|
| 976,656 | Hoyt | Nov. 22, 1910 |
| 1,364,360 | Emery | Jan. 4, 1921 |
| 2,088,870 | Reid | Aug. 3, 1937 |
| 2,680,445 | Hemminger | June 8, 1954 |